United States Patent
Le Hir et al.

(10) Patent No.: US 9,355,224 B1
(45) Date of Patent: May 31, 2016

(54) SYSTEM AND METHOD FOR DYNAMIC ADJUSTMENT OF EXPIRATION DATE FOR AUTHORIZATION KEY FOR ANTIVIRUS PRODUCTS

(75) Inventors: Stephane Le Hir, Suresnes (FR); Philippe Bodemer, Noisy le Roi (FR); Damiem M. Billy, La Celle Saint-Cloud (FR); Andrey A. Kulaga, Moscow (RU); Alexey Y. Kalgin, Moscow (RU); Andrey V. Kazachkov, Moscow (RU); Damir R. Shiyafetdinov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 1567 days.

(21) Appl. No.: 12/122,067

(22) Filed: May 16, 2008

(51) Int. Cl.
  *G06F 21/00* (2013.01)
  *G06F 21/10* (2013.01)
(52) U.S. Cl.
  CPC ...................................... *G06F 21/10* (2013.01)
(58) Field of Classification Search
  CPC ........................................................ G06F 21/10
  USPC ............................................................. 705/59
  See application file for complete search history.

(56) References Cited

U.S. PATENT DOCUMENTS

| | | | |
|---|---|---|---|
| 4,683,968 A * | 8/1987 | Appelbaum ............ | G06F 21/10 340/5.74 |
| 5,390,297 A * | 2/1995 | Barber et al. .................... | 726/29 |
| 6,055,503 A * | 4/2000 | Horstmann ...................... | 705/51 |
| 6,173,446 B1 * | 1/2001 | Khan et al. ...................... | 717/127 |
| 6,681,323 B1 * | 1/2004 | Fontanesi .................... | G06F 8/60 710/10 |
| 7,110,985 B2 * | 9/2006 | Chase, Jr. et al. ................ | 705/59 |
| 7,278,164 B2 * | 10/2007 | Raiz et al. ....................... | 726/26 |
| 7,337,147 B2 * | 2/2008 | Chen et al. ....................... | 705/59 |
| 7,500,108 B2 * | 3/2009 | Johnson et al. ................ | 713/187 |
| 7,752,139 B2 * | 7/2010 | Hu ................... | 705/59 |
| 2001/0034712 A1 * | 10/2001 | Colvin .................. | G06F 21/121 705/52 |
| 2002/0091645 A1 * | 7/2002 | Tohyama ................ | G06F 21/10 705/59 |
| 2002/0107809 A1 * | 8/2002 | Biddle .................. | G06Q 10/10 705/59 |
| 2004/0059678 A1 * | 3/2004 | Stefik et al. ..................... | 705/51 |
| 2004/0204949 A1 * | 10/2004 | Shaji ................... | G06F 11/1415 717/174 |
| 2004/0215627 A1 * | 10/2004 | Whalen .............. | H04L 41/0893 |
| 2005/0049973 A1 * | 3/2005 | Read et al. ....................... | 705/59 |
| 2005/0273437 A1 * | 12/2005 | Coley .................... | G06F 21/10 705/59 |
| 2006/0059106 A1 * | 3/2006 | Chase et al. ..................... | 705/59 |
| 2009/0138975 A1 * | 5/2009 | Richardson ..................... | 726/32 |

\* cited by examiner

*Primary Examiner* — Alexis Casey
(74) *Attorney, Agent, or Firm* — Bardmesser Law Group

(57) ABSTRACT

A system for a dynamic adjustment of expiration date of an authorization key, the system comprising: a security product that will be installed on a predetermined number of computers. The administration key allows a use of the software product on the predetermined number of computers during a predetermined period of time. The plurality of authorization units purchased from a vendor that are the smallest increments of time that a duration period of the authorization key is measured in. The expiration date for all the computers can be updated at any time, depending on the number of computers on which the software is installed at any given time. The administration server determines a beginning and an ending date of a functionality of the authorization key for the security product. The data base receives and stores the beginning and the ending date of the functionality of the authorization key for the security product. The communication means that send the beginning and the ending date of the functionality of the authorization key to the software product. The expiration date of the authorization date dynamically changes when the number of computer on which the product is installed increases or decreases.

10 Claims, 5 Drawing Sheets

SYSTEM AND METHOD FOR DYNAMIC ADJUSTMENT OF EXPIRATION DATE FOR AUTHORIZATION KEY FOR ANTIVIRUS PRODUCTS

BACKGROUND OF THE INVENTION

1. Field of the Invention

The present invention relates to a system and a method for a dynamic adjustment of expiration dates of authorization keys for antivirus products, while increasing or decreasing the number of computers that use the licensed antivirus product.

2. Description of the Related Art

Today many users install and use different software products from different vendors. There is a strong need to control and even defend such software products from unauthorized users.

One simple way to control use of software products is to assign a licensing key to each installed software product, so that when new software gets installed on a user's computer the licensing key gets tested, based on the results of the test, the user is allowed to use a new software product.

A control technology for checking the existence of a valid right when using digital content (documents, videos, audios, general software, such as programs) and permitting a user to use the digital content only if the user possesses a valid right is known as Digital Rights Management (DRM) technology. Known examples of DRM systems are access-ticket systems and Microsoft's Windows Rights Management System (WRMS). DRM technology can be generally divided into online and offline systems. The online system issues an online inquiry regarding rights of use to a server from a user terminal (such as a PC). The offline system performs rights authentication in advance and issues a right to use the digital content, namely, a license to a user terminal, and when the digital content is to be used, permits use of the digital content by referencing licenses within the user terminal.

For example, if the offline type of DRM is applied to software download sales, a license is generated at the server when a payment process is successful during a purchase. Thereafter, the license is managed at the terminal used by the user and can be continuously used until the expiration date of the license or the usage count is reached (or in perpetuity if there is no limit).

In actuality, there may be a request for a buy-back, transfer, or migration (movement of a license to another terminal) of a license. To achieve a buy-back, transfer, or migration of a license, it is necessary to delete the license from the terminal or invalidate the license.

On the other hand, software sales can take the form of migration licenses and upgrade licenses. A migration license is a license that is sold at a price lower than normal assuming the possession of a license of a competing product from another company. An upgrade license is a license that is sold for an upgraded software version at a price lower than normal assuming the possession of an earlier software version.

In either of these cases, once the use of a newly acquired licensing keys begins, there is no way to increase the number of the computers that use a software product with licensing keys unless personnel in the IT department contact the vendor and purchases more licensing keys for additional computers. Such licensing keys might have to be purchased at multiple points during the product's life cycle, and, for different computers, on different dates. This is time consuming and distracting for IT personnel, particularly where numerous different computer systems and software products are involved.

SUMMARY OF THE INVENTION

The present invention relates to as a system and a method for a dynamic adjustment of expiration date of authorization keys, while increasing or decreasing the number of computers that use the software products, such as antivirus/security products, that substantially eliminate one or several disadvantages of the related art.

In one aspect of the invention there is provided a system, method, and computer product for adjustment of expiration date of authorization keys, the method comprising: (a) installing a software product, such as an antivirus, with an authorization keys on the users' computers; (b) beginning operation of the installed software product on the users' computers; (c) using an administrative console increasing or decreasing the number of the users' computers that uses the software product with the authorization keys and increasing or decreasing an expiration date for the authorization keys; (d) saving in a database a new quantity of the computers using the software products with the authorization keys and a new expiration date of the authorization keys; (e) sending a new parameters of the authorization keys to the installed software products, wherein the installed products start working according to the new parameters of the authorization keys and terminating after the expiration date of the authorization keys.

Thus, the expiration date for all the computers can be updated at any time, depending on the number of computers on which the software is installed at any given time. The expiration date can be changed as software is installed on additional computers, or is uninstalled from some of the computers. The new expiration date of the authorization keys is calculated according to the formula $D=(T0-Tnow)*N0/N1$, where $T0$ is the number of (in this case) days of authorization desired initially (e.g., 365 days), $Tnow$ is the current time (for example, 91 days into the time $T0$), $N0$ is a number of computers with the authorization key on which the software product was installed initially, and $N1$ is a new number of computers that use this software product. The last date of authorization key functionality cannot exceed the authorization key expiration date.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiment of the present invention, examples of which are illustrated in the accompanying drawings.

Definitions

Administrator—a person, who is in charge of purchasing and installing software products on the company's computers.

Product—any software product that is installed on the computer. An example of such product is antivirus software, anti-spam or any security product that protects computers from malware programs. The software product could be distributed in several ways. For example, the software products could be installed on the computer from DVD, CD-ROM, CD-R, CD-RW, DVD-R, DVD-RW. The software product could also be purchased from vendors or could be downloaded from the Internet.

Authorization key—a certain file that is given to the Administrator that allows use of software products during certain period of time on the certain number of computers. Authorization key could also be an alphanumeric sequence of symbols or a binary sequence required to register and activate the product.

Protected computers—computers on which the software product is installed along with authorization key.

Administration server—server that regulates the installed on computers software products.

Administrator's console—regulation interface with the help of which the Administrator can regulate the server and the installed software products. An exemplary console is described in U.S. patent application Ser. No. 11/778,186, filed on Jul. 16, 2007, entitled SYSTEM AND METHOD FOR MOBILE APPLICATION ADMINISTRATION, incorporated herein by reference.

Duration period—period of time during which the Administrator that has the authorization key can use the software products.

Beginning date—date of the first installation of the authorization key on any computer in the company.

Ending date—date after which the Administrator loses the right to use the software products on any of the company's computers that has the authorization key.

Expiration date—the date after which the Administrator loses the rights to use the authorization key regardless of other conditions.

Figure 1:
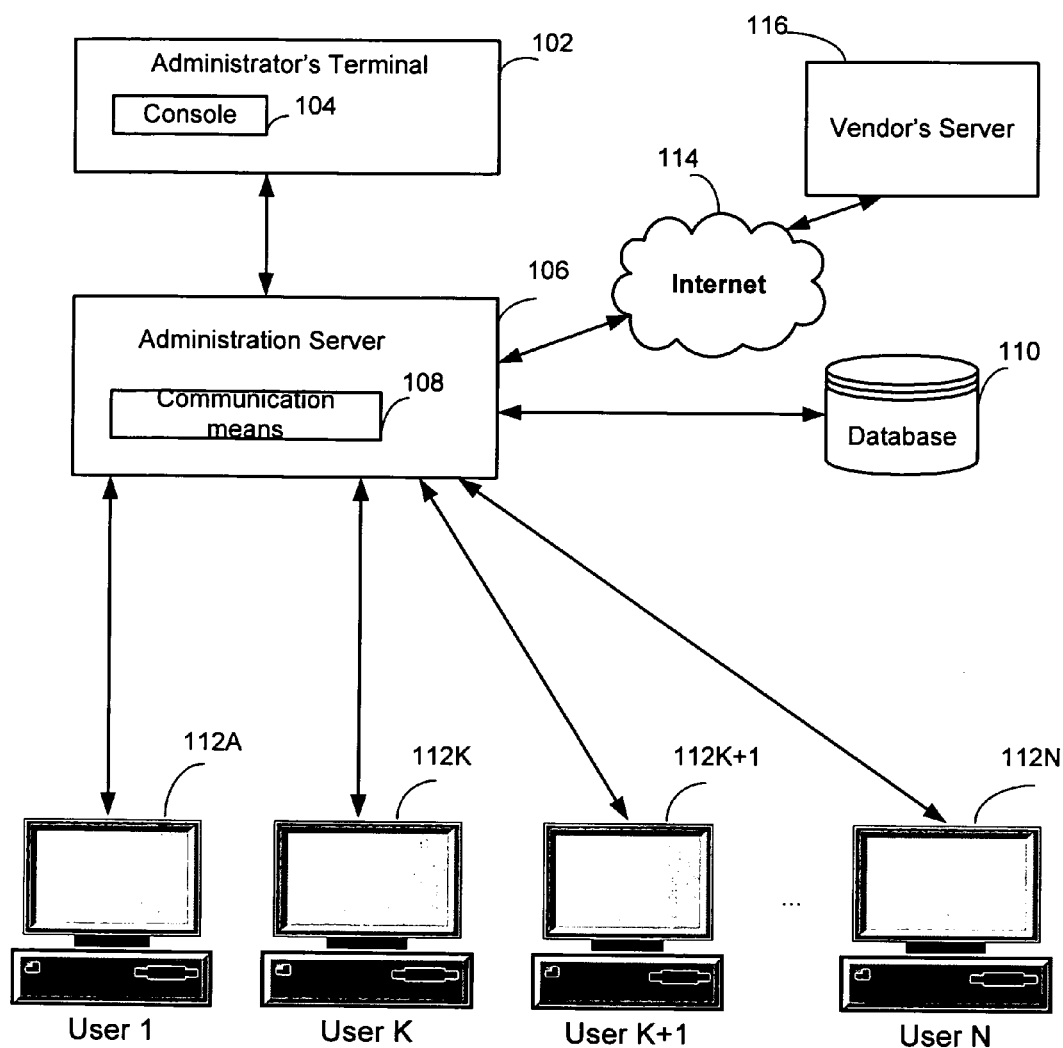
FIG. 1 illustrates a system for a dynamic adjustment of expiration date of authorization keys.

FIG. 1 illustrates a system for a dynamic adjustment of expiration date of authorization keys. After the user 112A through 112K obtained the software products, the administrator has to determine the number of computers the products will be installed. The administrator also has to determine how long the licenses to products are good for, and their expiration date. After the administrator determines all this information, the administrator, from administrator's terminal 102 through the administration server 106, installs the products and the authorization keys on a predetermined amount of computers 112A through 112K.

During the product's installation, the administrator, with the use of administrator's terminal 102, produces the data that relates to the general products' configurations. The administration server 106 produces general configuration settings for these products based on the configuration settings information received from the administrator. The general configuration settings in this case can include web address, type of notification and frequency of updating the software products.

The administration server 106 sends the configuration settings to a database 110, where this data gets saved. Then the administration server 106 configures the particular settings of the products for each particular computer 112A through 112K. The configured settings are sent to each computer via communication means 108. After that, the products are installed on each computer according to received configured settings. The communication means 130 could be channels, modems, or other interfaces. The communication means can also be the Internet or an Intranet.

The administration server 106 determines the beginning date of the functionality of the authorization key for each product. The server 106 also registers the beginning date in the database 110. Then the server 106 determines the ending date of the functionality of the authorization key, which is also registered in the database 110. The ending date is determined as the beginning date plus the duration period of the functionality of the authorization key. This duration period is also written into the file of the authorization key, if the key is maintained as a file. Alternatively, the expiration date of the authorization key can be embedded into the authorization key itself, if the key is only maintained as a binary/alphanumeric sequence.

Then server 106 sends, via communication means 108, the data pertaining to the beginning and the ending functionality date of the authorization keys to computers 112A through 112K. The server also sends information regarding the number of computers that can use the products. The products start working according to parameters of the authorization key. The administration server 106 also controls the duration period of the authorization key.

However, very often the situation could change and the number of the computers using the product could increase or decrease depending on the company's needs. When the need arises to increase the amount of computers uses the product that was previously installed on the computers 112A through 112K, the number of computers increases from 112A through 112K to 112K+1 through 112N (where K<N).

The addition of the computers 112K+1 through 112N is performed in the following way. The administrator, with the use of the console 104, gives the command to install the product. This command is sent from the administrator's terminal 102 to the administration server 106, which performs the installation of this product on the additional computers 112K+1 through 112N, along with the authorization key.

The installation of the authorization key on the additional computer is done in the following way. The administrator receives from the database 110 through the administration server 106 the authorization key that corresponds to the software product. The administrator performs the analysis of the received data and, with the use of the administrator's terminal 102, produces the data related to the settings of the software product. The general configuration settings may include web address, type of notification and frequency of update the software products. The administration server 106 performs a configuration specific configuration of general adjustments of the product for each additional computer 112K+1 through 112N.

The administration server 106, using the communication means 108, sends configuration settings to each additional computer 112K+1 through 112N. Then the product is installed on the additional computers 112K+1 through 112N. Then the installation product information is sent to the sever 106 via communication means 108. The server 106 then sends the installation product information to the administrator's terminal 102.

In addition, the administrator, with the use of console 104 that is installed on the administrator's terminal 102, analyses the attributes of the authorization key of the product. These attributes are written into the file of the authorization key that is saved in the database 110. Based on the analysis of the attributes of the authorization key, the administrator adds to the console 104 the additional computers 112K+1 through 112N. Then the administrator, using console 104, determines the new duration period of the authorization key for the product. The duration period is determined based on the data that is in the file of the authorization key.

The new expiration date of the authorization keys is calculated according to the formula $D=(T0-Tnow)*N0/N1$, where $T0$ is the number of (in this case) days of authorization desired initially (e.g., 365 days), Tnow is the current time (for example, 90 days into the time $T0$), $N1$ is a new number of computers that use this software product when the product was installed on the additional computers 112K+1 thorough 112N, and $N0$ is a number of computers with the authorization key on which the software product was installed initially. This assumes, of course, that the total number of purchased authorization units stays constant at the time Tnow. Thus, the expiration date can dynamically change at any time (either extend further into the future, or shorten), based on changing the number of computers with the software installed, and without needing to purchase additional licenses from the vendor (or losing any part of the license duration from those licenses already purchases, if the software is uninstalled).

For example, consider a scenario where initially, the software was installed on 10 computers, with a license for one year (365 days). Here, $N0=10$, $T0=365$, and the total number of authorization units=3650. 3 months after the first installation, the administrator decides to add the software to 10 more computers, giving $N1=20$, Tnow=91. According to the formula, $$D=(365-91)*(10/20)=136 \text{ days remaining, once the 10 additional computers are added.}$$

The new time duration, the new expiration date and the new number of computers, on which the product is installed, are introduced to the administrator at administrator's terminal 102. Once the administrator agrees with the received data, then the new duration period and the new number of computers, on which the product is installed, are registered in the data base 110. The information about D (the new time till expiration) and the new number of computers (N1), on which the product is installed, is sent from the server 106 via communication means 108 to the products that are installed on the computers 112A through 112N. Then the product starts working in accordance with the new limitation of the authorization key. The server 106 controls the duration period of the authorization key and the number of computers used the product that have the permission to use the product.

By way of another example, the product is installed on ten computers on Feb. 1, 2007. The beginning date of the functionality of the authorization key is Feb. 1, 2007. The duration period for the authorization key functionality is one year (12 months). There are 365 authorization units (the smallest increment of time that the authorization is measured in, i.e., here, one day). Then the administrator decided to install the product on ten additional computers. The administrator, with the use of console 104, determines the new duration period for the authorization key of the product. The new expiration date of the authorization key is determined using the formula: $D=(T0-Tnow)*N0/N1$.

As noted earlier, the beginning date of the functionality of the authorization key for first ten computers is Feb. 1, 2007. Therefore, the duration period CO for the authorization key (from the moment installation of the product on the first ten computers) is six months. There are 183 authorization units available at this time. Then the software product is installed on the additional ten computers of Aug. 1, 2007

The new duration period D of functionality of authorization key, calculated using the above formula, is 3 months from the moment the product was installed on the additional ten computers. There are 91 authorization units available at that time.

The administration server 106 determines the new expiration date of the authorization key. The expiration date is Oct. 31, 2007. The received data, i.e., the new duration period D (3 months), the new expiration date (Oct. 31, 2007), and the number of computers (20 computers) on which the product is installed, are introduced to the administrator for the approval.

When the administrator approves the received data, the received data is registered in the database 110. The information about the new duration period, the new expiration date and the number of computers on which the product is installed, is sent from the server 106 via communication means 108 to the product that is installed on the twenty computers. The new expiration date is embedded into the authorization key.

Then the product starts working in accordance with the new limitation of the authorization key. The administration server 106 controls the new duration period of the authorization key and the number of computers that uses the product that have the permission to use the product.

The software products terminate after the expiration date of the authorization key. The administrator may notify the vendor's server 116 via the Internet 114 that a new product installation or reauthorization is needed and purchase additional authorization units to extend the expiration date of the authorization keys.

In another example, the administrator may purchase a predetermined amount of authorization units for a predetermined amount of computers plus an extra amount of authorization units. This way, if later the administrator decides to increase a number of computers he can use additional authorization units without requesting them from the vendor. On the other hand, if the number of computers remained unchanged the expiration date of the authorization key extends beyond the original expiration date.

In another example, the administrator may have an opportunity to purchase extra units of authorization at the discount price. This way, he can add additional computers without buying additional units of authorization for the security products on the existing computers for additional amount of time.

In another example, the administrator could divide the computers into several groups, the computers in the group having a common expiration dates for their authorization keys (but each group having its own expiration date). For example, one group of computers has Jan. 31, 2007 as the expiration date of the authorization key and another group of computers has Jul. 31, 2007 as the expiration date of the authorization key. This way, the administrator knows that on Jan. 31, 2007 he needs to purchase authorization units only for the first group of the computers. The second group does not need any authorization units until Jul. 31, 2007.

Figure 2:
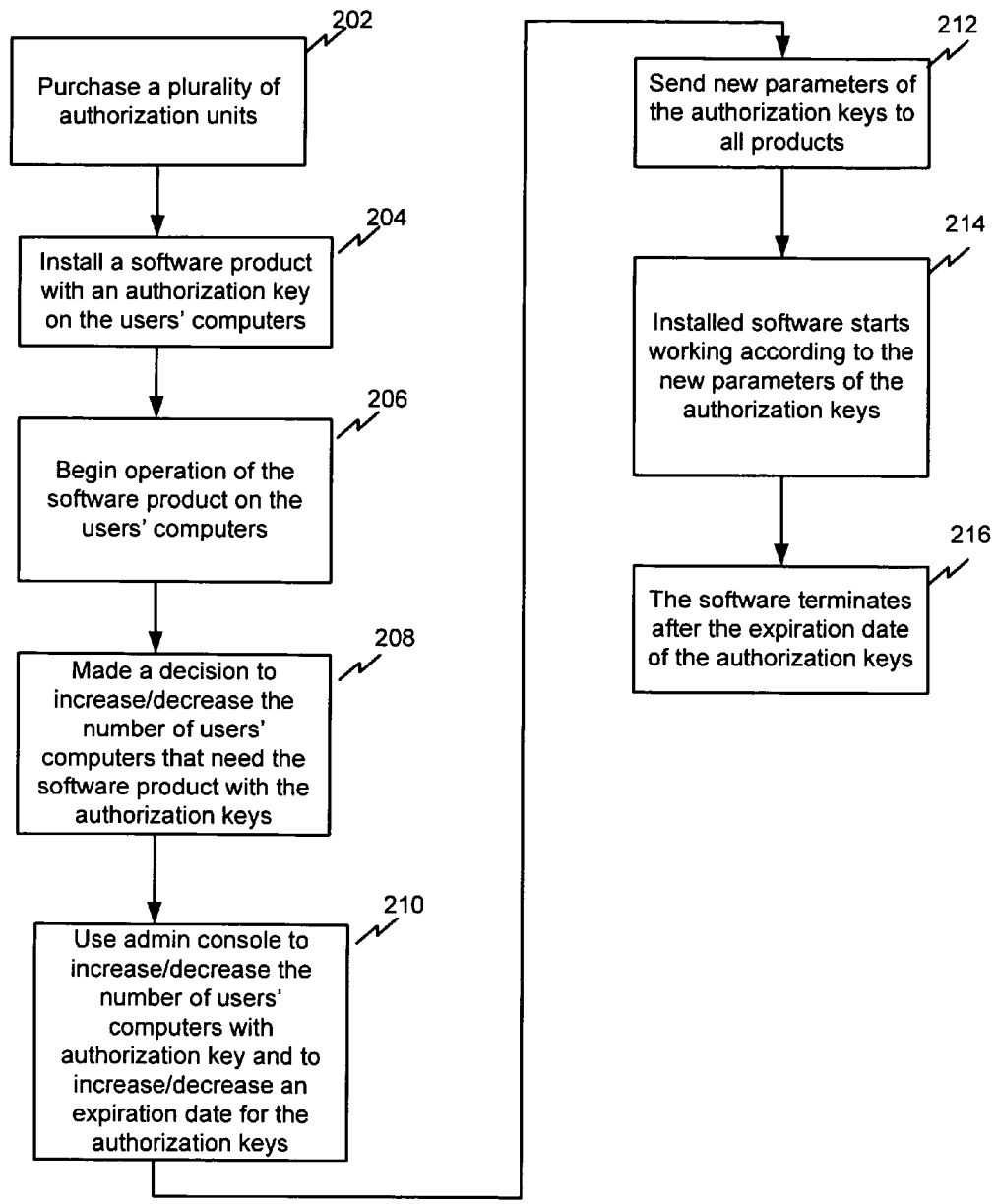
FIG. 2 illustrates a method for a dynamic adjustment of expiration date of authorization keys.

FIG. 2 illustrates a method for a dynamic adjustment of expiration date of the authorization key. In step 202 the administrator purchases a plurality of authorization units. In step 204 the administrator installs the software product with the authorization key on the computers 112A through 112K. In step 206 the product starts working on the computers 112A through 112K in accordance with the authorization key. Server 106 guarantees that the software product works according to the parameters of the authorization key. In step 208 the administrator makes a decision to increase/decrease the number of computers that needs the product with the authorization key.

In step 210 the administrator, using console 104, increases/decreases the number of computers (112K+1 through 112N) that needs the product with the authorization key. At the same time the duration period for authorization key is increases/decreases as well. In step 212, the server 106 sends the new parameters (e.g., the time duration and the expiration date) of the authorization key to the software product. In step 214, the installed software product starts working according to the new parameters of the authorization key. In step 216, the software product terminates after the expiration date of the authorization key.

Figure 3:
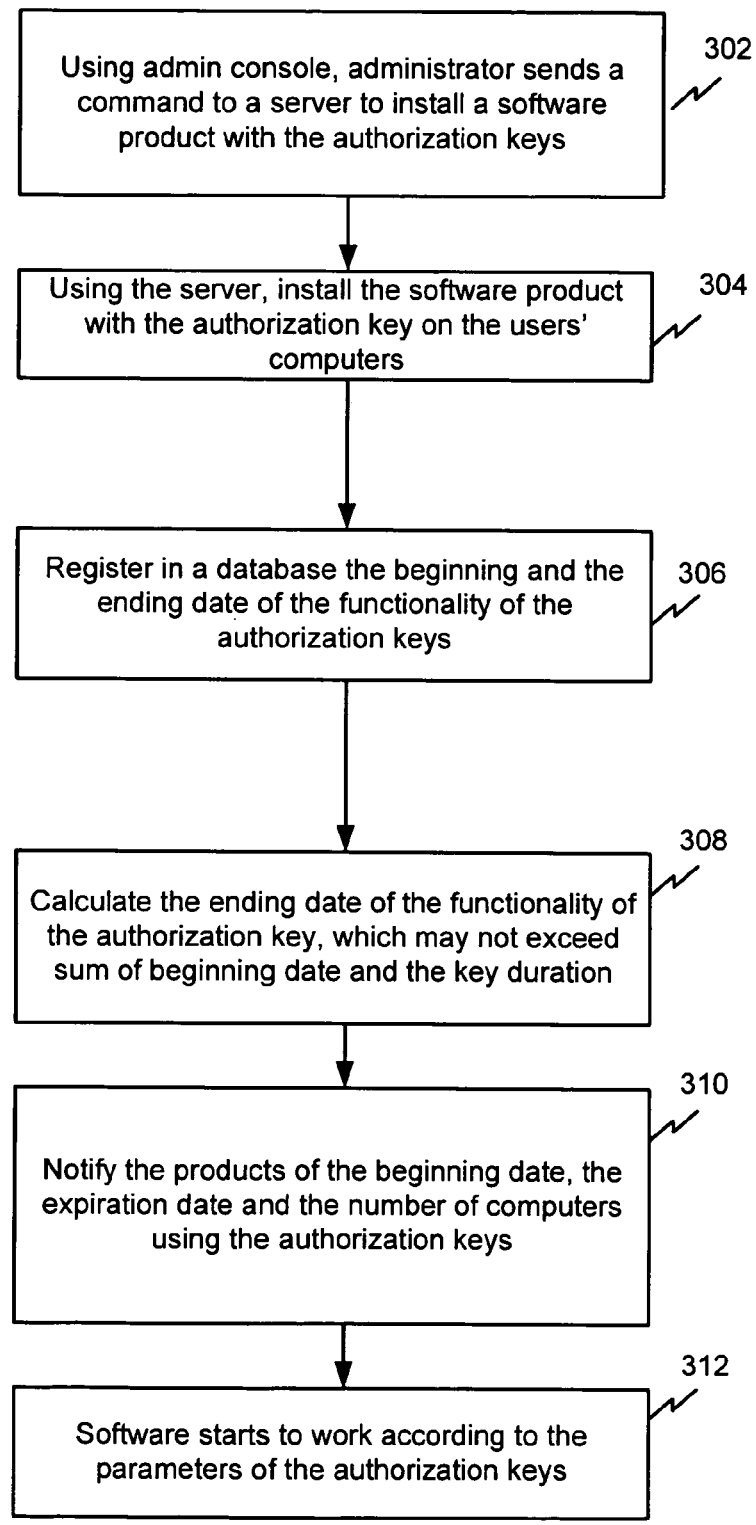
FIG. 3 illustrates a method for installing of a software product with an authorization key on the users' computers.

FIG. 3 illustrates a method for installing of a software product with an authorization key on the users' computers. This method is a detailed illustration of step 202 in FIG. 2.

In step 302 the administrator, using console 104, sends a command to the server 106 to install the software product with the authorization key. In step 304 the administration server 106 installs the software product with the authorization key on the computers 112A through 112K. In step 306 the server 106 registers in the database 110 the beginning and the ending date of the functionality of the authorization key. In step 308 the ending date of the functionality of the authorization key is calculated. The ending date must not exceed the sum of the beginning date and the key duration period. In step 310 the server notifies the product of the beginning date, the expiration date and the number of computers that uses the authorization key. In step 312 the product starts to work according to the parameters of the authorization key.

Figure 4:
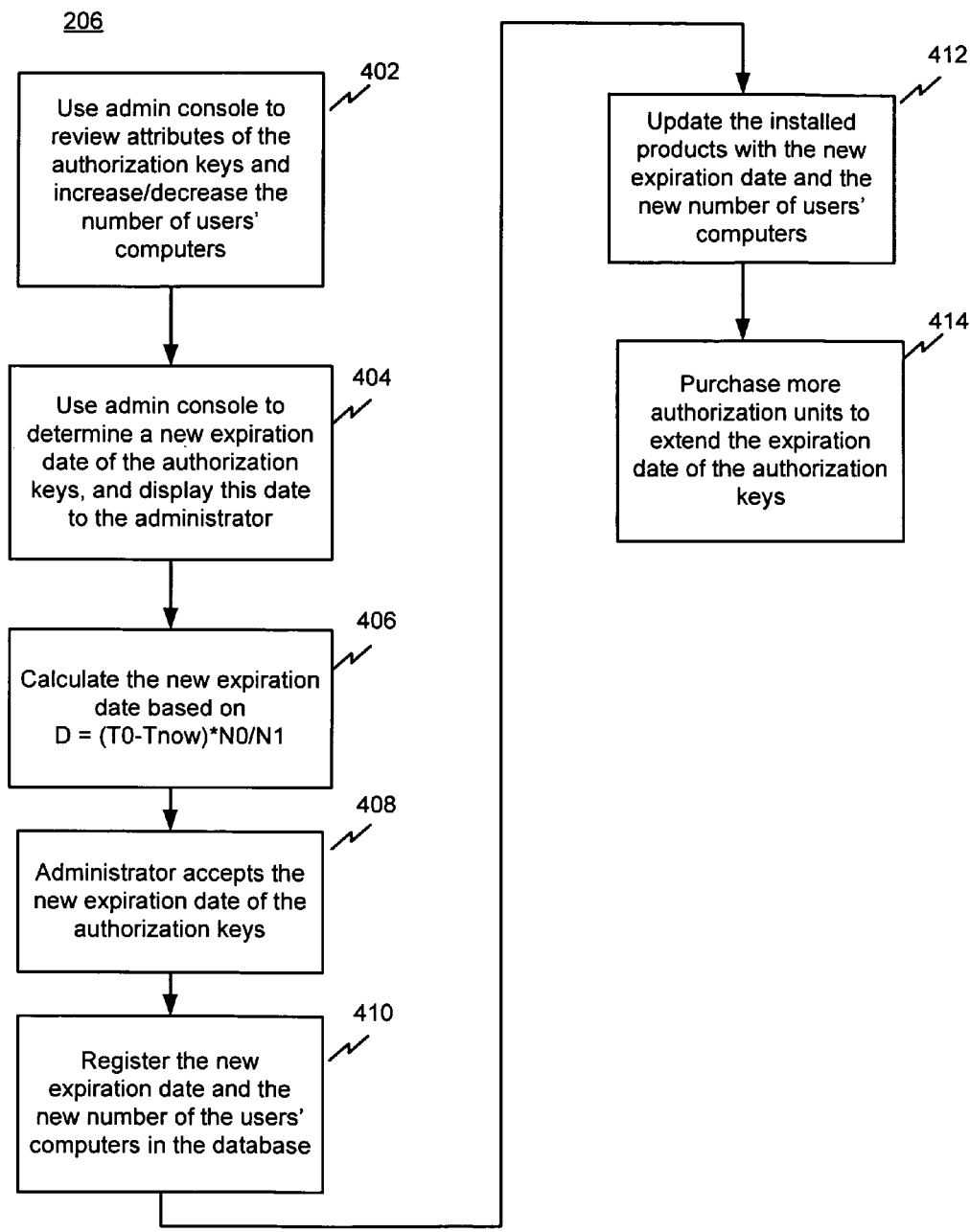
FIG. 4 illustrates a method for changing the number of computers that use a software product with the authorization key.

FIG. 4 illustrated a method for changing an amount of computer that uses a software product with the authorization key. This method is a detailed illustration of step 206 in FIG. 2.

In step 402 the administrator, with the use of console 104, reviews the attributes of the authorization key and increases/decreases the number of computers the uses the product with the authorization key. In step 404 the administrative console 104 determines the new expiration date of the authorization key and displays to the administrator this date. In step 406 the new expiration date is calculated using the formula: $D=(T0-Tnow)*N0/N1$. In step 408 the administrator accepts the new expiration date of the authorization key. In step 410 the administration server 106 registers in the database 110 the new expiration date and the new number of the computers the uses the product with the authorization key. In step 412, the server 106 notifies the vendor and the product of the new expiration date and the new number of the computers that use the product. In step 414 the administrator purchases more authorization units to extend the expiration date of the authorization keys.

Figure 5:
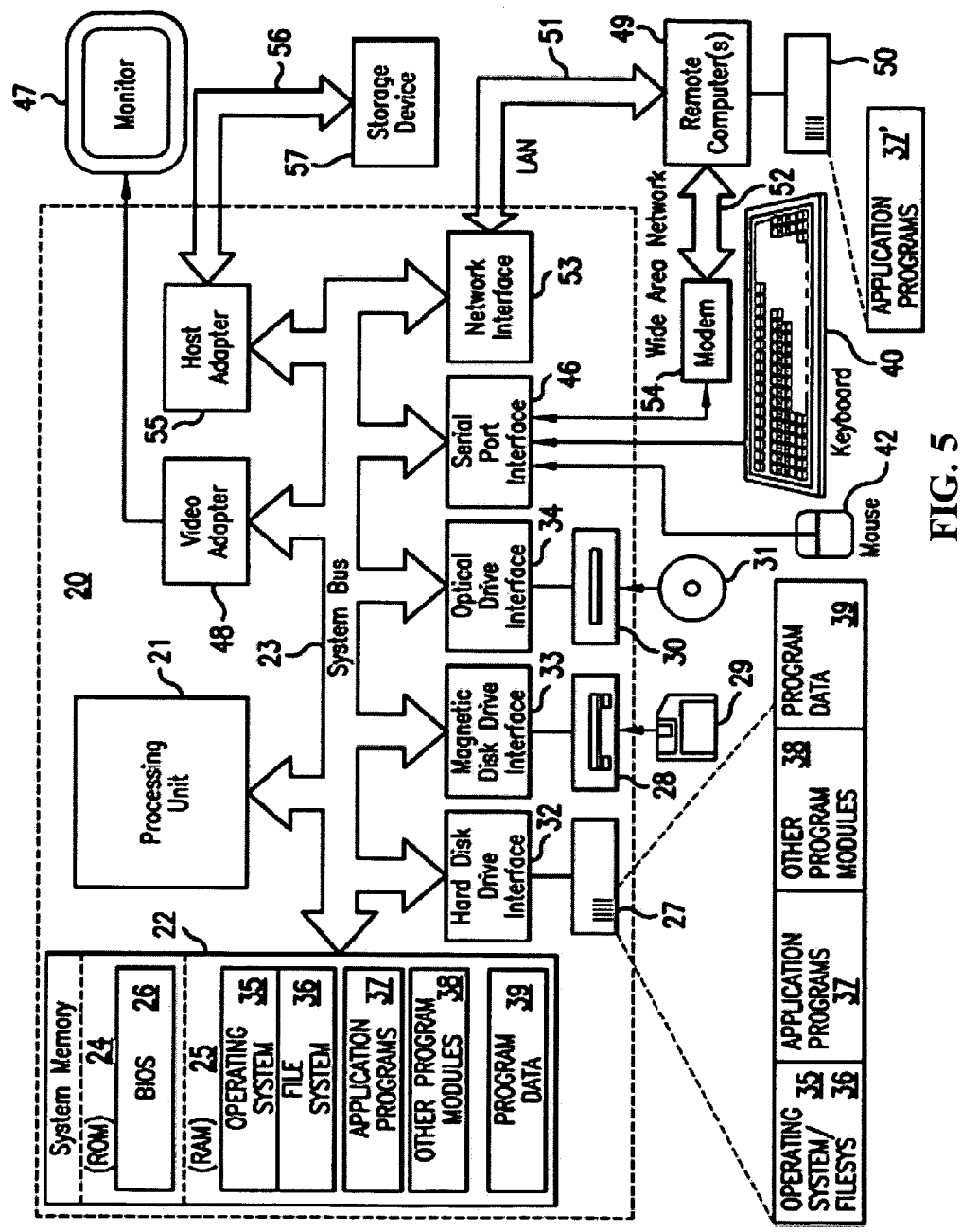
FIG. 5 illustrates an example of a computer system used for implementation of a proposed method.

With reference to FIG. 5, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules/subroutines, where each of the steps described above can be a separate module, or several steps can be aggregated into a single module, and other data for the personal computer 20. Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 coupled to the system bus, and can be connected by other interfaces, such as a parallel port, game port or universal serial bus (USB). A monitor 47 or some other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be represented by another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are common in offices, enterprise-wide computer networks, Intranets and the Internet.

When used in a LAN networking environment, the personal computer 20 is connected to the local network 51 through a network interface or adapter 53. When in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus can be achieved. It should also be appreciated that various modifications, adaptations and alternative embodiments thereof may be made within the scope and spirit of the present invention. The invention is further defined by the following claims.

What is claimed is:

1. A system for a dynamic adjustment of authorization for antivirus software, the system comprising:
    a predetermined number of computers having an antivirus product installed thereon;
    an authorization key that allows a use of the antivirus product on the predetermined number of computers during a predetermined period of time, wherein the authorization key is computer-independent and is associated with all the computers in the number of computers and not with any particular computer;
    a plurality of authorization units obtained from a vendor of the antivirus product, each authorization unit representing the smallest increment of time for measuring a duration of the authorization key, wherein the authorization unit represents a correlation between the predetermined number of computers and a predetermined period of the duration of the authorization key;
    an administration server that is configured to determine a beginning and an ending date of the authorization key for the antivirus product, and provides configuration data to the antivirus product, including frequency of updating of the antivirus product;
    a database that is configured to receive and store the beginning and the ending date of the authorization key for the antivirus product;
    wherein the administration server executes a console application that interfaces to the computers and to the vendor of the antivirus product, and sends the authorization key to computers having the antivirus product installed thereon;
    wherein the console application executing on the administration server changes an expiration date of the authorization key on each computer dynamically as time expires, such that the expiration date increases when the number of computers on which the antivirus product is installed decreases and decreases when the number of computers on which the antivirus product is installed increases,
    wherein the console application executing on the administration server notifies the vendor of the antivirus product of a new expiration date and a new number of computers on which the antivirus product is installed,
    wherein the console application executing on the administration server is configured to acquire additional authorization units to extend or shorten the expiration date of the authorization key to the new expiration date,
    wherein the authorization key is maintained as a file and is stored on each of the computers, and the duration period of the authorization key is written into the file,
    wherein the predetermined number of computers are divided into several groups, such that computers in a group have a common expiration date for the authorization key, but each group has its own expiration date, and
    wherein the duration period for the authorization key is determined by the console application using the formula: $D=(T0-Tnow)*N0/N1$, $T0$ is the number of initial authorization units for each computer, $Tnow$ is a current time, $N1$ is a new total number of computers, and $N0$ is a number of computers with the authorization key on which the antivirus product was initially installed.

2. The system of claim 1, wherein the ending date of the authorization key is determined as the beginning date plus the duration period of that authorization key.

3. The system of claim 1, wherein the ending date of the authorization key of the antivirus product is embedded into the authorization key.

4. A method for a dynamic adjustment of an expiration date for an antivirus product, the method comprising:
    obtaining a plurality of authorization units from a vendor of the antivirus product, each authorization unit representing the smallest increment of time for measuring a duration of a first authorization key, wherein the authorization unit represents a correlation between a predetermined number of computers and a predetermined period of the duration and an expiration date of the first authorization key;
    installing the antivirus product with the first authorization key on a predetermined number of the computers, wherein the first authorization key is computer-independent and is associated with all the computers in the number of computers and not with any particular computer;
    beginning operation of the installed antivirus product on the predetermined number of the computers;
    using a console application that executes on an administration server, changing the number of computers with the installed antivirus product and thereby changing the expiration date for the first authorization key; and
    sending new parameters of the first authorization key to computers with the installed antivirus product, the first authorization key and the new parameters modifying the expiration date; and
    sending configuration data to the installed antivirus product, including frequency of updating of the installed antivirus product,
    wherein the installed antivirus product start working according to the new parameters of the first authorization key,
    wherein the console application changes the expiration date of the first authorization key on each computer dynamically as time expires, such that the expiration date increases when the number of computers on which the antivirus product is installed decreases, and decreases when the number of computers on which the antivirus product is installed increases; and notifying the vendor of the antivirus product of the expiration date based on the new parameters and a new number of computers on which the antivirus product is installed, wherein the first authorization key is maintained as a file and is stored on each of the computers, and the duration period of the first authorization key is written into the file, wherein additional authorization units are acquired from the vendor of the antivirus product by the console application executing on an administration server, wherein the console application interfaces to the computers and to the vendor of the antivirus product, and wherein the console application executing on the administration server extends or shortens the expiration date of the first authorization key, and wherein the predetermined number of computers are divided into several groups, such that computers in a group have a common expiration date for the first authorization key, but each group has its own expiration date, and wherein the duration period for the first authorization key is determined by the console application using the formula: $D=(T0-Tnow)*N0/N1$, where $T0$ is the number of initial authorization units for each computer, Tnow is a current time, $N1$ is a new total number of computers, and $N0$ is a number of computers with the first authorization key on which the software product was initially installed.

5. The method of claim 4, wherein installing the antivirus product with the first authorization key on the predetermined number of computers further comprises:

using the console application, sending a command to the administration server to install the antivirus product with the first authorization key;

registering in a database an ending date of the first authorization key;

calculating the expiration date of the first authorization key, which does not exceed a sum of a beginning date and a key duration period; and notifying each installed antivirus product of the expiration date of the first authorization key.

6. The method of claim 4, further comprising:

using the console application, reviewing attributes of the first authorization key and changing a number of the computers that use the antivirus product;

using the console application, determining the expiration date of the first authorization key after the new parameters have been applied and displaying this date to the administrator; and registering in a database the determined expiration date of the first authorization key and a new number of the computers using the antivirus product.

7. The method of claim 6, further comprising purchasing additional authorization units to extend the expiration date of the first authorization key, and distributing the additional authorization units to the computers having the antivirus product installed thereon.

8. The method of claim 7, wherein the expiration date of the first authorization key is a sum of a current date plus a duration period of the functionality of the authorization key.

9. The method of claim 4, wherein the expiration date is embedded into the first authorization key.

10. A computer useable non-transitory storage medium having computer executable program logic stored thereon, the computer executable program logic executing on a processor for implementing the steps of:

obtaining a plurality of authorization units from a vendor of the antivirus product, each authorization unit representing the smallest increment of time for measuring a duration of a first authorization key, wherein the authorization unit represents a correlation between a predetermined number of computers and a predetermined period of the duration and an expiration date of the first authorization key;

installing the antivirus product with the first authorization key on a predetermined number of the computers, wherein the first authorization key is computer-independent and is associated with all the computers in the number of computers and not with any particular computer;

beginning operation of the installed antivirus product on the predetermined number of the computers;

using the console application that is executing on an administration server, changing the number of computers with the installed antivirus product and thereby changing the expiration date for the first authorization key; and sending new parameters of the first authorization key to computers with the installed antivirus product, the first authorization key and the new parameters modifying the expiration date; and sending configuration data to the installed antivirus product, including frequency of updating of the installed antivirus product, wherein the installed antivirus product start working according to the new parameters of the first authorization key, wherein the console application changes the expiration date of the first authorization key on each computer dynamically as time expires, such that the expiration date increases when the number of computers on which the antivirus product is installed decreases, and decreases when the number of computers on which the antivirus product is installed increases; and notifying the vendor of the antivirus product of the expiration date based on the new parameters and a new number of computers on which the antivirus product is installed, wherein the first authorization key is maintained as a file and is stored on each of the computers, and the duration period of the first authorization key is written into the file, wherein additional authorization units are acquired from the vendor of the antivirus product by the console application executing on the administration server, wherein the console application interfaces to the computers and to the vendor, and wherein the console application extends or shortens the expiration date of the first authorization key, and wherein the predetermined number of computers are divided into several groups, such that computers in a group have a common expiration date for the first authorization key, but each group has its own expiration date, and wherein the duration period for the first authorization key is determined by the console application using the formula: $D=(T0-Tnow)*N0/N1$, where $T0$ is the number of initial authorization units for each computer, Tnow is a current time, $N1$ is a new total number of computers, and $N0$ is a number of computers with the first authorization key on which the software product was initially installed.

* * * * *